United States Patent [19]
Davis et al.

[11] Patent Number: 5,994,810
[45] Date of Patent: Nov. 30, 1999

[54] INTEGRAL STEEL-ALUMINUM RING FOR EDDY CURRENT ACTIVATED FRICTION CLUTCH

[75] Inventors: John B. Davis, Tonka Bay; Rick Vatsaas, Eagan, both of Minn.; Kent Carlson, Britton, S. Dak.

[73] Assignee: Horton, Inc., Minneapolis, Minn.

[21] Appl. No.: 09/214,404

[22] PCT Filed: Feb. 11, 1998

[86] PCT No.: PCT/US98/03022

§ 371 Date: Dec. 23, 1998

§ 102(e) Date: Dec. 23, 1998

[87] PCT Pub. No.: WO98/35169

PCT Pub. Date: Aug. 13, 1998

Related U.S. Application Data

[63] Continuation of application No. 08/798,851, Feb. 12, 1997, abandoned.

[51] Int. Cl.$^6$ .................................................. H02K 49/02
[52] U.S. Cl. ............................. 310/105; 310/42; 29/596; 192/84.1
[58] Field of Search ...................... 310/105, 106, 310/42, 43; 29/598, 596; 192/85 AA, 84.91, 186, 84.1

[56] References Cited

U.S. PATENT DOCUMENTS

| | | | |
|---|---|---|---|
| 726,536 | 4/1903 | Holz | 192/12 R |
| 1,136,279 | 4/1915 | Severy | 192/48.2 X |

(List continued on next page.)

FOREIGN PATENT DOCUMENTS

| | | |
|---|---|---|
| 0202749 | 11/1986 | European Pat. Off. . |
| 0404048 | 12/1990 | European Pat. Off. . |
| 2355205 | 1/1978 | France . |
| 2375494 | 7/1978 | France . |
| 671285 | 2/1939 | Germany . |
| 1020242 | 11/1957 | Germany ............................. 192/48.2 |
| 1020243 | 11/1957 | Germany ......................... 192/84 PM |
| 1188191 | 3/1965 | Germany . |
| 1613060 | 1/1971 | Germany . |
| 2653459 | 6/1978 | Germany . |
| 2821973 | 11/1978 | Germany . |
| 3203143 | 8/1983 | Germany . |
| 3443523 | 6/1986 | Germany . |
| 4207710 | 9/1993 | Germany . |
| 59-226721 | 12/1984 | Japan . |
| 61-130630 | 6/1986 | Japan . |
| 390375 | 8/1965 | Switzerland . |
| 1077724 | 8/1967 | United Kingdom . |
| 1268444 | 3/1972 | United Kingdom . |
| 2054279 | 2/1981 | United Kingdom . |
| 9523281 | 8/1995 | WIPO . |

OTHER PUBLICATIONS

Patent Abstracts of Japan, vol. 095, No. 005, Jun. 30, 1995 & JP 07 047463 A (Isuzu Motors Ltd.), Feb. 21, 1995.

*Primary Examiner*—Nestor Ramirez
*Assistant Examiner*—B. Mullins
*Attorney, Agent, or Firm*—Alan Kamrath; Oppenheimer, Wolff & Donnelly, LLP

[57] ABSTRACT

A fan clutch (A') includes an eddy current drive (224) having a first, magnetic field producing drive component rotatable with the output and a second, coupling drive component rotatable with the input in the form of a sheave (50'). The first drive component includes permanent magnets (226). The second drive component is of a one-piece construction including a steel ring (238) embedded in a body portion (241) formed of aluminum. The steel ring (238) includes locating ears (310) for properly locating and retaining the ring (238) in a mold half (324). Positioning tabs (312, 314) extend from the faces (302, 304) of the ring (238) and prevent the ring (238) from floating in the volume between the mold halves (318, 324) which forms the body portion (241) during the introduction of the molten aluminum. The body portion (241) is integrally formed with circumferentially spaced air moving vanes (264) and an annular disc portion (260) for mounting to the sheave (50').

19 Claims, 2 Drawing Sheets

U.S. PATENT DOCUMENTS

| | | | |
|---|---|---|---|
| 1,306,784 | 6/1919 | Soames et al. | 322/28 |
| 1,556,427 | 10/1925 | Coughtry | 192/70.14 |
| 1,742,804 | 1/1930 | Carhart | 192/113.23 |
| 1,742,805 | 1/1930 | Carhart | 192/70.2 X |
| 1,935,581 | 11/1933 | Snow, Jr. | 192/70.12 |
| 2,221,014 | 11/1940 | Williamson | 192/18 A |
| 2,232,454 | 2/1941 | Haupt | 192/113.26 X |
| 2,241,242 | 5/1941 | Friedman | 192/113.23 |
| 2,488,079 | 11/1949 | Sensaud deLavaud et al. | 310/105 |
| 2,519,449 | 8/1950 | Findley | 192/21.5 |
| 2,581,637 | 1/1952 | Danly et al. | 192/113.23 |
| 2,597,388 | 5/1952 | Sensaud de Lavaud | 192/84.91 |
| 2,658,593 | 11/1953 | Doebeli | 192/48.2 |
| 2,661,148 | 12/1953 | Englander | 416/32 |
| 2,679,604 | 5/1954 | Jaeschke | 310/101 |
| 2,714,437 | 8/1955 | Spase | 192/70.2 |
| 2,732,921 | 1/1956 | Rabinow | 192/21.5 |
| 2,902,612 | 9/1959 | Whearley | 310/105 |
| 2,937,803 | 5/1960 | Cunningham | 417/420 |
| 3,167,673 | 1/1965 | Miquel et al. | 192/186 |
| 3,209,184 | 9/1965 | Woodward, Jr. | 310/103 |
| 3,229,132 | 1/1966 | Cohen et al. | 310/95 |
| 3,291,273 | 12/1966 | Hansen | 192/85 AA |
| 3,353,641 | 11/1967 | Chana | 192/85 AA |
| 3,382,384 | 5/1968 | Hulls | 310/93 |
| 3,403,275 | 9/1968 | Little | 310/103 |
| 3,450,910 | 6/1969 | Jaeschke et al. | 310/95 |
| 3,456,141 | 7/1969 | Burgess | 310/114 |
| 3,478,239 | 11/1969 | Jaeschke | 310/105 |
| 3,488,535 | 1/1970 | Baermann | 310/93 |
| 3,488,536 | 1/1970 | Baermann | 310/93 |
| 3,566,168 | 2/1971 | Matsubara | 310/105 |
| 3,601,641 | 8/1971 | Baermann | 310/93 |
| 3,896,911 | 7/1975 | Beneke | 192/18 A |
| 3,921,702 | 11/1975 | Ward, III | 164/112 |
| 3,974,408 | 8/1976 | Fehr et al. | 310/103 |
| 4,094,393 | 6/1978 | Spokas | 192/82 P |
| 4,139,085 | 2/1979 | Kanbe et al. | 192/107 R |
| 4,378,061 | 3/1983 | Schierling et al. | 192/85 AA |
| 4,400,638 | 8/1983 | Albrecht et al. | 310/95 |
| 4,415,166 | 11/1983 | Beia | 277/51 |
| 4,425,993 | 1/1984 | Schilling | 192/85 A |
| 4,446,391 | 5/1984 | Sekine et al. | 310/62 |
| 4,488,627 | 12/1984 | Streich et al. | 192/48.2 |
| 4,498,066 | 2/1985 | Fujiwara et al. | 335/281 |
| 4,499,409 | 2/1985 | Bauer | 318/383 |
| 4,508,985 | 4/1985 | Pavlik et al. | 310/55 |
| 4,526,257 | 7/1985 | Mueller | 192/48.2 |
| 4,540,381 | 9/1985 | Molloy et al. | 464/29 |
| 4,555,239 | 11/1985 | Miranti | 192/113.23 X |
| 4,564,775 | 1/1986 | Mazzorana | 310/62 |
| 4,576,266 | 3/1986 | Schilling et al. | 192/70.12 |
| 4,688,951 | 8/1987 | Guers | 384/446 |
| 4,696,378 | 9/1987 | Brooks | 188/170 |
| 4,718,526 | 1/1988 | Koitabashi | 192/35 |
| 4,766,986 | 8/1988 | Dayen et al. | 192/113.21 X |
| 4,846,326 | 7/1989 | Tilton et al. | 192/70.19 |
| 4,907,683 | 3/1990 | Patel | 192/85 AA |
| 4,926,992 | 5/1990 | Linnig | 192/48.2 |
| 4,989,708 | 2/1991 | Gaggermeier | 192/70.2 |
| 4,997,074 | 3/1991 | Larson et al. | 192/85 AA X |
| 5,050,711 | 9/1991 | Sawato | 188/164 |
| 5,059,161 | 10/1991 | Bredt | 475/269 |
| 5,226,517 | 7/1993 | Grochowski | 192/85 AA |
| 5,234,090 | 8/1993 | Haka | 192/70.25 |
| 5,238,095 | 8/1993 | Pedu | 192/84.1 |
| 5,284,230 | 2/1994 | Takaki | 192/113.23 X |
| 5,301,779 | 4/1994 | Nash | 192/70.2 |
| 5,611,415 | 3/1997 | Davis et al. | 192/18 A |
| 5,613,586 | 3/1997 | Schilling et al. | 192/48.3 |
| 5,636,719 | 6/1997 | Davis et al. | 192/18 A |

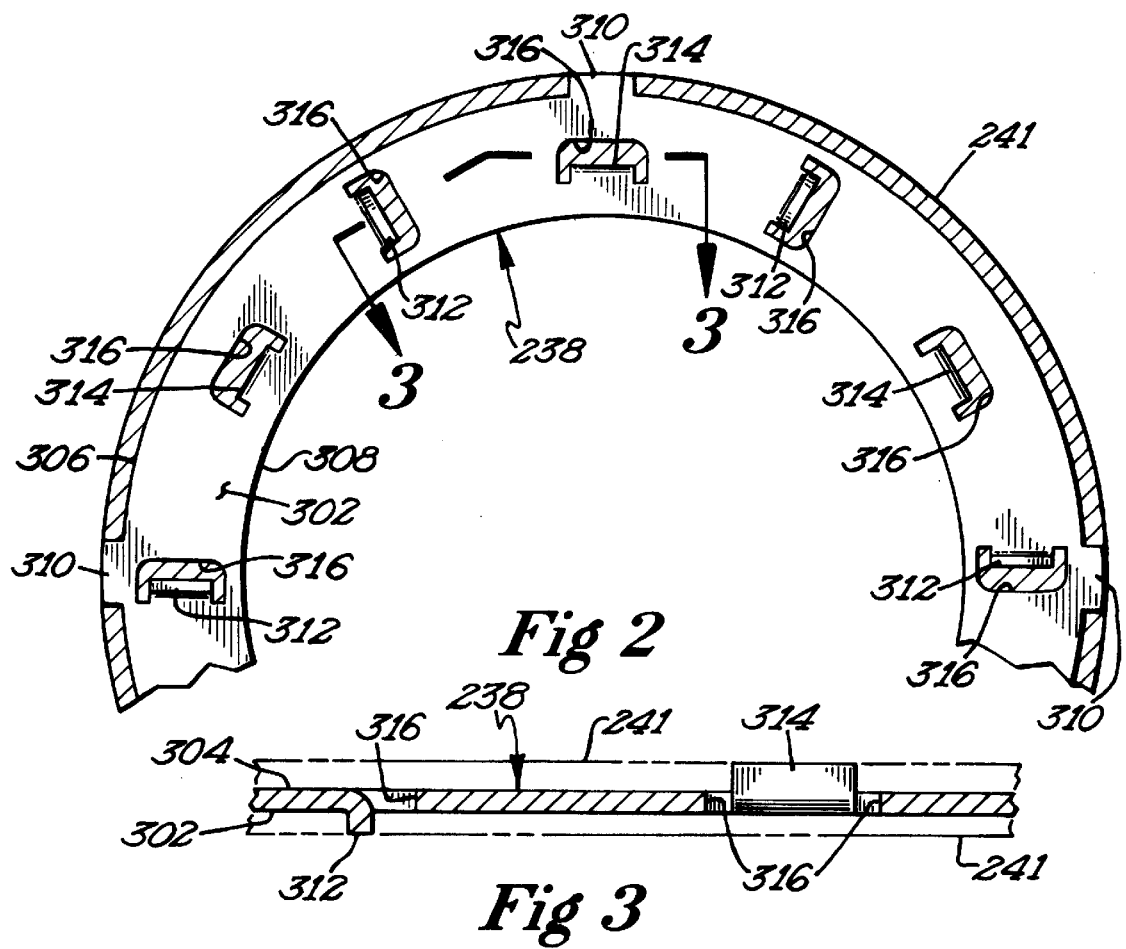
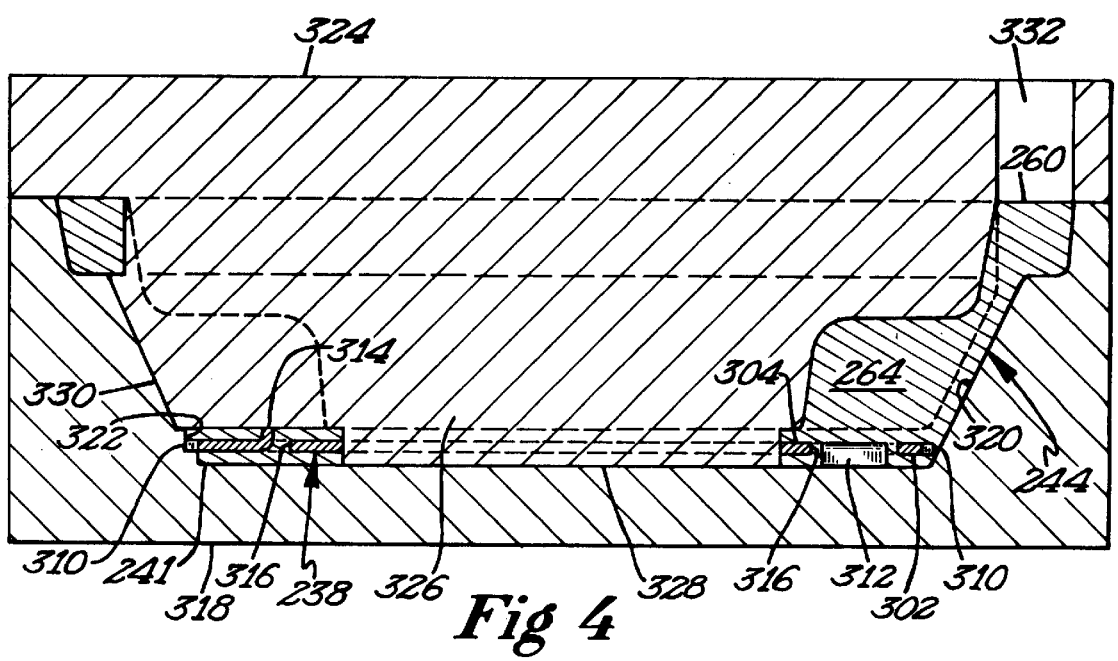

INTEGRAL STEEL-ALUMINUM RING FOR EDDY CURRENT ACTIVATED FRICTION CLUTCH

CROSS REFERENCE

This application is a filing under 35 U.S.C. §371 of International Application No. PCT/US 98/03022 filed Feb. 11, 1998 which is a continuation of U.S. application Ser. No. 08/798,851 filed Feb. 12, 1997, now abandoned.

BACKGROUND

The present invention generally relates to eddy current drives, relates particularly to improved drive components for eddy current drives, and relates specifically to improved integral drive components for eddy current drives.

In a typical eddy current drive, a first, magnetic field producing drive component such as in the form of permanent magnets is mounted for rotation with one of the input or output of a rotational control apparatus such as a clutch for magnetically coupling with a second, coupling drive component mounted for rotation with the other of the input or output. The second, coupling drive component was typically in the form of a first ring formed of electrically conductive material such as copper sandwiching a second ring of magnetic flux conductive material such as steel against a mounting body portion formed of heat conductive material such as aluminum so that the body portion acts as a heat sink. Screws extended through the first and second rings and were threaded into the body portion.

Prior coupling drive components suffered from various problems and deficiencies. Specifically, heat is generated in the copper ring but its transfer to the body portion is restricted by the steel ring positioned between the copper ring and the body portion. Additionally, when exposed to heat, copper will oxidize reducing the efficiency of the eddy current drive. Further, the mechanical attachment of the steel and copper rings to the body portion increases the number of components and assembly required and is subject to loosening and/or separating and thereby detrimentally affecting reliability.

Thus, a need exists for improved coupling drive components for eddy current drives which overcome the problems and deficiencies of prior eddy current drives.

SUMMARY

The present invention solves this need and other problems in the field of eddy current drives by providing, in the preferred form, an improved, integrally formed drive component including a ring formed of magnetic flux conductive material (steel) embedded in a body portion formed of generally nonmagnetic, heat conductive material (aluminum) to provide magnetic coupling in an eddy current drive.

Thus, it is an object of the present invention to provide a novel eddy current drive including first and second drive components rotatable with the input and the output.

It is further an object of the present invention to provide a novel magnetic coupling drive component for an eddy current drive.

It is further an object of the present invention to provide such a novel magnetic coupling drive component of a one-piece construction.

It is further an object of the present invention to provide such a novel magnetic coupling drive component which is not subject to loosening and/or separating.

It is further an object of the present invention to provide such a novel magnetic coupling drive component having a significant decrease in assembly requirements.

It is further an object of the present invention to provide such a novel magnetic coupling drive component having reduced inventory requirements.

It is further an object of the present invention to provide such a novel magnetic coupling drive component eliminating copper oxidation problems.

It is further an object of the present invention to provide such a novel magnetic coupling drive component which rapidly dissipates heat.

It is further an object of the present invention to provide such a novel magnetic coupling drive component having improved reliability.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIGS. 2 and 3 show partial, cross-sectional views of the rotational control apparatus of FIG. 1 according to section line 2—2 of FIG. 1 and section line 3—3 of FIG. 2, respectively.

FIG. 4 shows a diagrammatic, cross-sectional view of a mold for forming the drive component according to the preferred teachings of the present invention.

Figure 1:
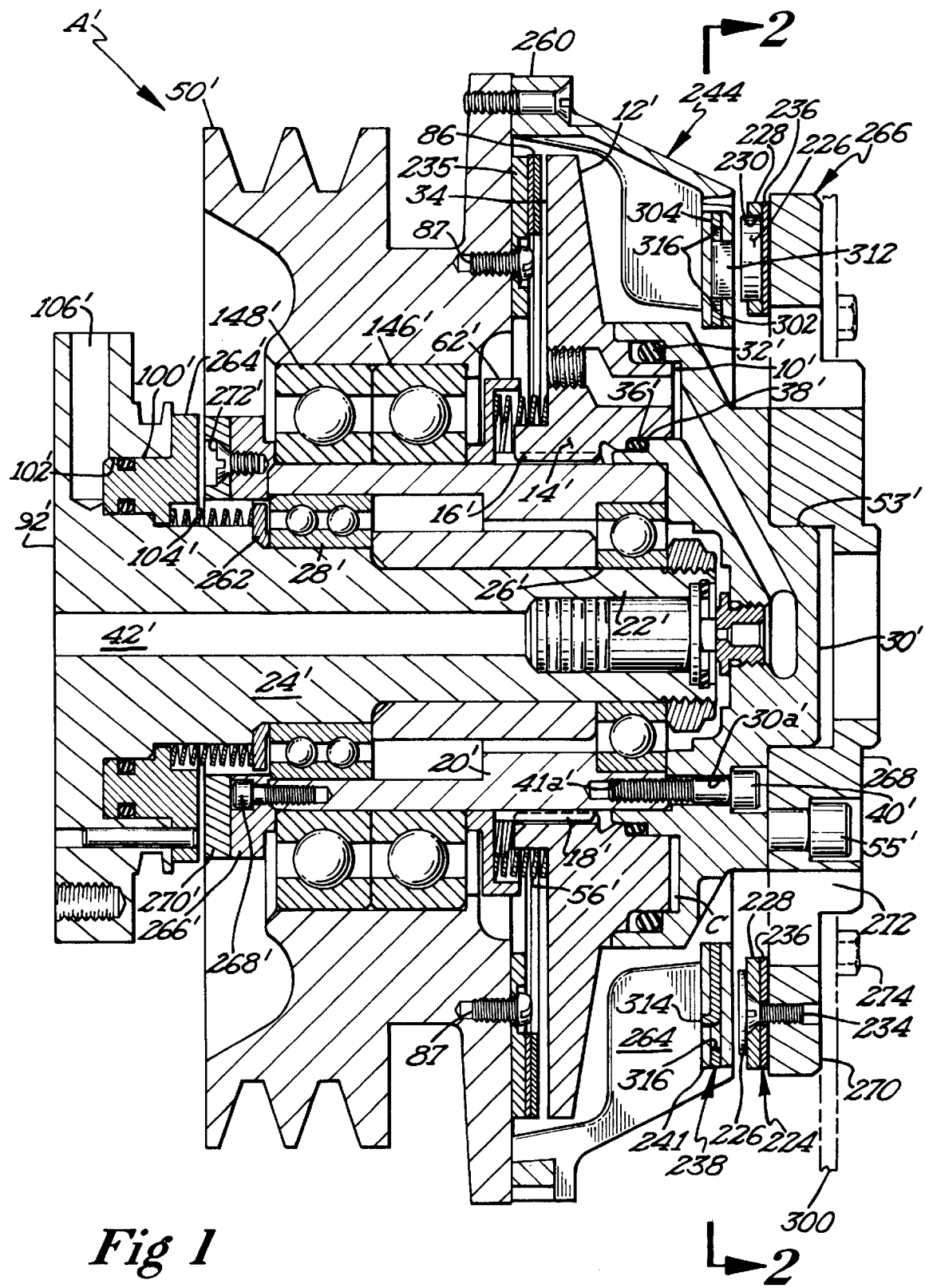
FIG. 1 shows a cross-sectional view of a rotational control apparatus in a preferred form of a fan clutch including an eddy current drive according to the preferred teachings of the present invention.

The figures are drawn for ease of explanation of the basic teachings of the present invention only; the extensions of the figures with respect to number, position, relationship, and dimensions of the parts to form the preferred embodiment will be explained or will be within the skill of the art after the following description of the preferred embodiment has been read and understood. Further, the exact dimensions and dimensional proportions to conform to specific force, weight, strength, and similar requirements will likewise be within the skill of the art after the following description of the preferred embodiment has been read and understood.

Where used in the figures of the drawings, the same numerals designate the same or similar parts. Furthermore, when the terms "first", "second", "internal", "radial", "axial", "inward", "outward", and similar terms are used herein, it should be understood that these terms have reference only to the structure shown in the drawings as it would appear to a person viewing the drawings and are utilized only to facilitate describing the preferred embodiment.

DESCRIPTION

A rotational control apparatus according to the preferred teachings of the present invention is shown in the drawings in the preferred form of a fan clutch and is generally designated A'. In most preferred embodiment of the present invention, clutch A' is an improvement of the type shown and described in U.S. Pat. Nos. 5,611,415 and 5,636,719 and International Publication Number WO 95/23281. For purpose of explanation of the basic teachings of the present invention, the numerals designate the same or similar parts for the same numeral notation in the figures of U.S. Pat. Nos. 5,611,415 and 5,636,719 and International Publication Number WO 95/23281. The description of the same or similar parts and clutch A' may be found herein and in U.S. Pat. Nos. 5,611,415 and 5,636,719 and International Publication Number WO 95/23281, which are hereby incorporated herein by reference.

Referring to the drawings in detail, clutch A' includes a first output member to be driven in the form of an annular piston 10' which has formed thereon the annular friction disc 12' and the internal annular base portion 14'. Formed internally of annular base portion 14' are the torque transmitting surfaces in the form of internal splines 16' which engage with the external torque transmitting surfaces in the form of splines 18' of the hub 20'. Thus, friction disc 12' is slideably mounted for reciprocation between a first position and a second position on and rotationally related to hub 20' by splines 16' and 18'. The hub 20' is rotatably mounted on the reduced outward end 22' of stationary shaft 24' by means of the bearings 26' and 28', with stationary shaft 24' defining the rotational axis of clutch A'.

An annular cylinder block 30' slideably mounts the annular piston 10' with sealing engagement by means of the O-ring 32' mounted in the annular groove formed in the piston 10' and the O-ring 36' mounted in the annular groove 38' formed in cylinder 30'. The cylinder 30' is secured and rotationally related to the hub 20' by means of a multiplicity of spaced bolts 40' which extend through clearance holes 30a' in the cylinder block 30' and engage threaded holes 41a' in hub 20'. Air pressure is introduced through shaft 24' and into cylinder C by conventional conduit means 42' including a suitable rotary union. In the preferred form, piston 10' includes an overheating protection device such as of the type disclosed in U.S. Pat. No. 5,398,794.

Mounted on hub 20' are the bearings 146' and 148' which rotatably mount an input in the preferred form of the sheave 50' which is typically driven by the engine crank shaft by belts. An abutment or washer 62' is slideably received on hub 20' and sandwiched between splines 18' and bearings 146' on hub 20'. Further provided is the compression coil spring 56' sandwiched between washer 62' and piston 10' and providing a biasing force for moving piston 10' from the second position to the first position. Friction facing ring 86 is mounted on the side of sheave 50' such as by screws 87 and in axial alignment with annular friction engagable surface or portion 34 on friction disc 12'. In the most preferred form, the screws for mounting ring 86 extend through a steel ring 235 which mounts and carries ring 86. Ring 86 engages the annular friction engagable portion 34 when air pressure is introduced into cylinder C thereby clutching in and rotatably relating the friction disc 12', the hub 20' and the cylinder block 30' on which fan blades of a fan 300 may be mounted on the pilot extension 53'. With facing 86 engaging annular friction engagable portion 34, hub 20', cylinder block 30' and fan 300 mounted thereon will rotate at the same speed or in other words a 1:1 ratio with respect to sheave 50'. Thus, ring 86 and portion 34 define a friction interface drive between the input and output portions of clutch A' which is actuated when piston 10' is in the second position.

Because fan 300 is not supplied with clutch A' in the most preferred form and to insure that air flow is allowed past the front of cylinder block 30' independent of the actual fan 300 mounted on cylinder block 30', a fan mount 266 is provided with clutch A' in the most preferred form. In particular, mount 266 includes a central annular portion 268 of a diameter for slideable receipt and mounting on pilot extension 53' of cylinder block 30'. Mount 266 further includes an outer annular portion 270 of a size larger than annular portion 268. Circumferentially spaced legs 272 integrally extend between portions 268 and 270 to hold them in a spaced, concentric arrangement. In the most preferred form, annular portion 270 has an axial thickness less than that of legs 272 and/or portion 268 to form a pilot extension for slideable receipt of fan 300. Bolts 274 can be provided extending through fan 300 and threaded into portion 270 for securing fan 300 to mount 266. Mount 266 in turn can be secured to cylinder block 30' by studs 55' extending through annular portion 268 and/or legs 272. It can then be appreciated that air flow is allowed through openings defined by and intermediate annular portions 268 and 270 and legs 272. However, it should be appreciated that mount 266 could be integrally formed with cylinder block 30'.

Clutch A' according to the preferred teachings of the present invention further includes an eddy current drive 224 between the input and output portions of clutch A'. Specifically, in the preferred form, drive 224 includes a first drive component shown as a plurality of circumferentially spaced permanent magnets 226 radially spaced from the rotation axis of clutch A'. In the most preferred form, magnets 226 are in the form of discs and are radially oriented and held at circumferentially spaced locations with alternating polarity to the input by an annular magnetic holder 228 including a plurality of apertures 230 formed therein for receipt and holding of magnets 226. Holder 228 is formed from generally nonmagnetic material such as aluminum for magnetically isolating magnets 226 in holder 228 from each other. In the most preferred form, holder 228 and magnets 226 mounted therein are mounted to a radially oriented or extending surface on the opposite axial side of annular portion 270 than fan 300. Sandwiched between portion 270 and holder 228 including magnets 226 is a ring 236 formed of magnetic flux conductive material such as steel, with screws 234 extending through suitable apertures formed in ring 236. It should be noted that legs 272 are positioned radially inward of magnets 226.

In the preferred form, magnets 226 are generally in the form of circular discs. In the most preferred form, the discs are generally oval in shape and include first and second surfaces located along parallel chords of the circular shape on opposite sides and equally spaced from the center of the circular shape and arranged generally perpendicular to a radius from the clutch axis. Thus, the overall radial size of holder 228 and of eddy current drive 224 can be minimized to allow clutch A' of the present invention including eddy current drive 224 to be easily substituted in prior installations utilizing the clutches of the type disclosed in U.S. Pat. Nos. 4,226,095; 4,877,117; and 5,059,161 or the like.

Drive 224 further includes a second drive component shown as a ring 238 formed of electrically conductive material such as steel and in the most preferred form is generally radially oriented. In the most preferred form, ring 238 is cast or embedded inside an annular body portion 241. In the most preferred form, annular body portion 241 is mounted on the input portion and specifically is secured to sheave 50' such as by an annular support 244. In the most preferred form, annular support 244 includes a first annular disc portion 260 sandwiched against the side of sheave 50' by suitable screws. Annular body portion 241 is located parallel to but paced from annular disc portion 260. Circumferentially paced and radially extending air moving vanes 264 may be integrally formed on annular body 241 opposite to magnets 226 to form air moving fins integrally extending from the body portion 241 opposite to the first drive component and for cooling ring 238. In the most preferred form, vanes 264 also extend between and are integrally formed with portions 241 and 260 at circumferentially spaced locations. The screws extending through portion 260 are located intermediate vanes 264 of support 244. In the most preferred form, the radial inner edges of vanes 264 generally follow the profile of cylinder block 30' and friction disc 12'. Annular body portion 241 located around ring 238, vanes 264 and portion 260 are integrally formed of generally nonmagnetic, heat conductive material such as aluminum and act as a heat sink. Therefore, as heat is generated inside and/or drawn to annular body portion 241 from ring 238, radiation heating of magnets 226 by ring 238 is minimized.

In operation of clutch A' and assuming the input portion of clutch A', i.e. sheave 50', is being rotated by conventional means hereinbefore referred to, the fan blades are rotated about the axis of clutch A' by introducing sufficient fluid pressure through conduit means 42' into cylinder C which forces piston 10' in the direction towards sheave 50' into the second, full engagement position whereby the friction engagement surface of friction ring 86 engages the friction engagement surface or portion 34 to rotatably relate the input and output portions of clutch A'. As a result of the above, which is contrary to the urging of springs 56', the output portion of clutch A', i.e. annular cylinder block 30' with the fan blades thereon, are rotated generally at the rotational speed of sheave 50'. With fluid pressure released, springs 56' urge friction disc 12' from the second, full engagement position whereby friction ring 86 is separated or disengaged from portion 34.

With the fluid pressure totally released from cylinder C, springs 56' urge friction disc 12' to the first, full magnetic drive position. Specifically, due to its mounting on the input portion, ring 238 of clutch A' rotates at the rotational speed of the input portion. Due to eddy current principles, forces between magnets 226 and the coupling drive component induce rotation of the output portion of clutch A'. The rotational speed of the output portion of clutch A' is less than the rotational speed of the input portion due to the torque load placed upon the output portion by the fan blades in the most preferred form. The rotational speed of the output portion relative to the input portion is then dependent upon the number and strength of magnets 226, the axial spacing between magnets 226 and the coupling drive component, the speed of rotation of the input portion, and the torque load placed upon the output portion.

Further, when clutch A' is utilized in its preferred form as a fan clutch, the fan blades of the output portion are driven either due to the rotational relation provided by the engagement of friction ring 86 with annular friction engagable portion 34 or by eddy current drive 224 of the present invention. However, there are occasions when it is desired that the fan blades remain stationary. Clutch A' according to the preferred teachings of the present invention includes provisions for rotatably relating hub 20' to a further portion of clutch A' which is stationary in the most preferred form and specifically to shaft 24'. Specifically, shaft 24' is secured to a radial flange mounting bracket 92' by any suitable means. Clutch A' further includes an annular piston 100' which is reciprocally received in a cylinder cavity 102' formed in bracket 92'. Piston 100' is biased into cavity 102' by a spring 104' sandwiched between a stop 262 held axially on shaft 24'. Piston 100' is moved in cavity 102' against the bias of spring 104' by fluid pressure introduced through inlet 106' formed in bracket 92'. Piston 100' includes an integral friction disc 264'.

Clutch A' according to the preferred teachings of the present invention further includes an annular, radial extension 266' secured to the end of hub 20' opposite cylinder block 30' by any suitable means such as by screws 268'. In the most preferred form, bearings 146' and 148' are sandwiched on hub 20' between extension 266' and washer 62'. A friction ring 270' is removably secured to and carried by extension 266' such as by screws 272'. Friction ring 270' is engaged by friction disc 264' when air pressure is introduced into cavity 102' thereby rotatably relating hub 20', bracket 92', and shaft 24' is and thus braking the fan blades secured to cylinder block 30' secured to hub 20' to prevent their windmilling due to the passing of air over the fan blades and to prevent their being driven by eddy current drive 224 in the most preferred form.

If fluid pressure is introduced into cavity 102' while being released from cylinder C, eddy current drive 224 is also over-ridden as hub 20' is rotatably related to bracket 92' thus slowing and stopping rotation of the fan blades. Suitable valving should be provided to prevent fluid pressure from being simultaneously introduced into cylinder C and cavity 102'. It can then be appreciated that clutch A' according to the teachings of the present invention provides three speeds for the fan blades, i.e. at engine speed, at less than engine speed, and stopped in the most preferred form.

Furthermore, when air actuated, i.e. when fluid pressure is introduced into cylinder C, the force transfer path through clutch A' is from friction ring 86, through friction disc 12' to hub 20' through splines 16' and 18', through bearings 146' and 148', through sheave 50', and back to friction ring 86, with no relative rotation occurring through bearings 146' and 148' between hub 20' and sheave 50'. No actuation force occurs through bearings 26' and 28'. Thus, substantially less force is placed upon bearings 26' and 28' in the construction of clutch A' according to the preferred teachings of the present invention than through the bearings which mount the hub and are in the actuation force path in the clutches of U.S. Pat. Nos. 4,226,095 and 4,877,117 and with the bearings which mount the sheave in the clutches of U.S. Pat. Nos. 4,226,095 and 4,877,117 being subjected to relative rotation at all times that the engine is running thus increasing wear and decreasing life. The construction of clutch A' of the preferred form further includes piston 10' having an increased cross-sectional area to allow greater actuation pressure to be placed upon friction disc 12' with the same fluid pressure. This greater actuation pressure allows the size of friction ring 86 to be minimized while still providing the same degree of actuation such that the overall diametric size of clutch A' can be reduced from clutches of the type of U.S. Pat. Nos. 4,226,095; 4,877,117; and 5,059,161 having corresponding performance characteristics. Thus, clutch A' according to the preferred teachings of the present invention is able to fit in smaller installations or the same size installations with eddy current drive 224 as prior installations utilizing clutches of the type disclosed in U.S. Pat. Nos. 4,226,095; 4,877,117; and 5,059,161.

Clutch A' as described is generally of the type shown and described in U.S. Pat. Nos. 5,611,415 and 5,636,719 and International Publication Number WO 95/23281. However, it can be appreciated that other constructions may be applicable to utilize the teachings of the present invention.

A further aspect of the present invention relates to a preferred method of manufacture of the second drive component of drive 224. Specifically, ring 238 includes a front face 302 which is adjacent to the first drive component including magnets 226 and an opposite face 304. In the most preferred form, faces 302 and 304 are radially oriented. Ring 238 further includes a first, radially outer edge 306 and a second, radially inner edge 308 extending between faces 302 and 304, with edge 306 being concentric to and radially spaced from edge 308. In the preferred form, locating ears 310 integrally extend radially from edge 306 and have faces contiguous with and in the same plane as faces 302 and 304. In the most preferred form, ears 310 are equally circumferentially spaced at 90° intervals around edge 306.

Ring 238 further includes circumferentially spaced positioning tabs 312 extending generally perpendicularly from face 302 and circumferentially spaced positioning tabs 314 extending generally perpendicularly from face 304. In the preferred form, tabs 312 and 314 are integrally formed with ring 238 and are each equally circumferentially spaced at 60° from each other, with tabs 314 located circumferentially intermediate tabs 312. Tabs 312 extend generally in a radial direction while tabs 314 extend generally perpendicular to a radial direction.

In the preferred form, tabs 312 and 314 are formed by bending relative to ring 238 and in the most preferred form are formed as cut-outs 316 in ring 238 spaced from and between edges 306 and 308. Additionally, cut-outs 316 have a physically larger size than tabs 312 and 314.

To embed ring 238 in body portion 241 and to integrally form the second drive component, a lower, female mold half 318 is provided with a downwardly extending cavity 320 having a shape corresponding to the outer outline of the second drive component. Ring 238 is positioned in cavity 320 such that tabs 312 abut with the bottom surface of cavity 320. Cavity 320 includes indentations 322 for receiving locating ears 310 for properly locating and retaining ring 238 at the desired rotational position inside of cavity 320. An upper, male mold half 324 is provided with a downward extending protrusion 326 having a shape corresponding to the inner outline of the second drive component and for receipt in cavity 320. Projections or protrusions 328 and 330 extend from one or both of cavity 320 and protrusion 326 to define the radially inner edge of body portion 241 and vanes 264, respectively. Tabs 314 abut with the bottom surface of protrusion 326. In this regard due to the radial orientation of vanes 264 and the orientation of tabs 314 generally perpendicular to a radial direction, tabs 314 will not have a tendency to extend into the voids between protrusions 330 which define vanes 264 but will tend to abut with protrusions 330 and extend over the voids between protrusions 330. If tabs 314 extended into the voids between protrusions 330, ring 238 could tip in the volume defined by and between cavity 320 and protrusion 326. Mold half 324 includes an inlet 332 through which molten material can be poured, with inlet 332 located outwardly of protrusion 326 and inwardly of cavity 320 when halves 318 and 324 are positioned together.

To fabricate the second drive component, molten, generally nonmagnetic, heat conductive material such as aluminum in the preferred form is poured into inlet 332 and flows around and through the annular space between cavity 320 and protrusion 326 which form disc portion 260, through the voids between cavity 320 and protrusion 326, and protrusions 330 which form vanes 264, and into and around the volume between cavity 320, protrusion 326, and protrusions 328 which form body portion 241, with the voids being in fluid communication with the annular space and the volume. It should then be appreciated that the abutment of tabs 312 and 314 with mold halves 318 and 324 prevent ring 238 from floating between cavity 320 and protrusion 326 with the introduction of molten material. Additionally, cut-outs 316 facilitate that molten material will flow from between face 304 and protrusion 326 to the volume between face 302 and cavity 320. The nonmagnetic material (i.e. aluminum) in front of the magnetic flux conductive material (i.e. steel) of ring 238 acts in a similar fashion as the separate steel and copper rings in providing the magnetic coupling required in eddy current drive 224.

It should then be appreciated that the second drive component of drive 224 according to the teachings of the resent invention is advantageous. Specifically, the second drive component is a one-piece component which is not subject to loosening and/or separating as with mechanically attached parts and thus improves reliability. Similarly, the relatively minor additional step of inserting ring 238 between halves 318 and 324 for fabricating portion 241 and support 244 is a significant decrease in the assembly requirements than for the mechanical attachment of copper and steel rings to the body portion 241 as was previously performed. Further, it is no longer necessary to inventory the copper ring and mechanical attachment members as was previously required. Additionally, the elimination of the copper ring also eliminates the copper oxidation problems and resulting efficiency reduction of prior constructions. Furthermore, any heat generated in the second drive component is better transferred because the aluminum between face 302 and magnets 226 is an integral part of vanes 264 which rapidly dissipate heat. Thus, better cooling of the second drive component and of the entire drive 224 is obtained.

It should be appreciated that the construction of clutch A' according to the preferred teachings of the present invention is believed to be advantageous. Specifically, considerable heat can be generated by slippage of friction disc 12' and friction ring 86. Further, heat is also generated by the rotation of magnets 226 relative to ring 238. Mount 266 acts as a heat sink to draw heat away from magnets 226. Likewise, annular portion 241 acts as a heat sink to draw heat from ring 238 and thus away from magnets 226. Additionally, rotation of vanes 264 with sheave 50' at all times when the engine is running increases heat transfer from annular body portion 241. In particular, vanes 264 draw air from the front of cylinder block 30' between legs 272 to provide cooling of body portion 241 by convection. Additionally, vanes 264 draw air from the front of cylinder block 30' between legs 272 to provide cooling of magnets 226 and ring 238 by convection. In this regard, vanes 264 move the air outwardly to create a pressure differential which draws air between magnets 226 and ring 238 to create air flow therebetween which would likely not occur or would be practically non-existent if air movement means would not be included. As the performance and life of magnets 226 may be detrimentally affected by heat, clutch A' according to the preferred teachings of the present invention protect magnets 226 from excessive heat conditions.

It should then be noted that permanent magnet eddy current drives for fan clutches are known which provide for fan rotation at speeds less than engine speed but which do not provide direct drive with the engine speed. Further, electromagnetically operable clutches are known which provide for fan rotation at engine speed through a first electromagnetic clutch and at lower than engine speed through a second electromagnetic clutch via an eddy current coupling. However, persons skilled in the art did not recognize the synergistic results which are obtainable utilizing a permanent magnet eddy current drive in combination with a nonelectromagnetically controlled clutch and specifically with a fluid and particularly an air actuated clutch. In particular, it should be noted when clutch A' of the present invention is actuated in the most preferred form by the introduction of full fluid pressure against the biasing force of spring 56', clutch A' of the present invention rotates the fan blades at engine speeds with eddy current drive 224 and specifically magnets 226 and holder 228 and also ring 238 rotating at engine speeds due to their connection to output and input portions of clutch A'. Thus, the engagement of annular friction engageable portion 34 with friction ring 86 overrides eddy current drive 224 due to the simultaneous rotation of magnets 226 and ring 238. Thus, clutch A' of the present invention operates in the same manner as the clutches of U.S. Pat. Nos. 4,226,095; 4,877,117; and 5,059,161 when friction ring 86 is axially displaced to engage annular friction engageable portion 34.

However, when piston 10' is axially spaced from the second position such that friction ring 86 is axially displaced from annular friction engageable portion 34, clutch A' of the present invention continues to drive the fan blades through eddy current drive 224. Specifically, due to their mounting to the input portions, ring 238 of clutch A' rotates at engine speed whether or not portion 34 is engaged by friction ring 86. Due to the magnetic attraction of magnets 226, the output portion of clutch A' is driven and rotate about the clutch axis at a speed less than that of the input portion or in other words at speeds less than engine speed due to the torque load placed on the output portion by the fan blades. Specifically, with fluid pressure released, spring 56' will move piston 10' to the first position so that the output will be driven at the rotational speed of eddy current drive 224 at its first, full magnetic drive position.

It should further be appreciated that no separate controls or other actuation are required for eddy current drive 224 such that clutch A' of the present invention can be easily substituted in prior installations utilizing clutches of the type disclosed in U.S. Pat. Nos. 4,425,993; 4,226,095; and 4,877,117 or the like. In particular, no electric controls such as would be necessary for electromagnetically operable drives are required according to the preferred teachings of the present invention. Specifically, when actuated with full fluid pressure, clutch A' of the present invention including eddy current drive 224 has the same operation as the clutches of U.S. Pat. Nos. 4,425,993; 4,226,095; and 4,877,117 which do not include the eddy current drive. However, in the absence of fluid pressure and without actuation of any kind, eddy current drive 224 is then revealed in clutch A' of the present invention to drive and rotate the fan blades rather than to simply let the fan blades be rotationally free as in the clutches of U.S. Pat. Nos. 4,425,993; 4,226,095; and 4,877,117.

Furthermore, the particular construction of clutch A' according to the teachings of the present invention is believed to be particularly advantageous. Particularly, eddy current drive 224 is included in clutch A' without requiring the addition of further disc or other mounting components. Specifically, the first and second drive components of drive 224 are mounted to mount 266 or to friction disc 12', with mount 266 and friction disc 12' being necessary components for providing direct drive actuation through friction ring 86. Furthermore, clutch A' according to the preferred teachings of the present invention is further believed to be advantageous since eddy current drive 224 is included with minimal increase in radial size since magnets 226 and rings 238 and 242 are mounted at generally the same radial spacing from the clutch axis as friction ring 86.

It should be noted that clutch A' according to the preferred teachings of the present invention has a construction which is very simple in nature, lends itself to very economical manufacturing, and is very durable.

Now that the basic teachings of the present invention have been explained, many extensions and variations will be obvious to one having ordinary skill in the art. For example, although shown and described for use as a fan clutch, clutch A' according to the teachings of the present invention may be utilized in other applications such as, but not limited to, for driving an alternator, an air conditioner, or the like.

Likewise, although placement of the components of eddy current drive 224 on the input and output portions of clutch A' is believed to be advantageous in the particular preferred forms shown, reversal of the components of eddy current drive 224 on the input and output portions may be possible according to the teachings of the present invention.

Likewise, although the sealing engagement of piston 10' with block 30' is accomplished by O-rings 32' and 36' in the preferred form, other manners of providing fluid pressure against piston 10' for moving piston 10' can be utilized according to the teachings of the present invention. For example, a diaphragm could be utilized extending between piston 10' and block 30'. Similarly, an expandable bladder could be utilized for moving piston 10'.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Apparatus for controlling rotation of an output relative to a rotatable input comprising, in combination: a first drive component rotatable with one of the input and the output; and a second drive component rotatable with the other of the input and the output, with the first drive component producing a magnetic field, with the second drive component being integrally formed and including a ring formed of magnetic flux conductive material embedded in a body portion formed of generally nonmagnetic, heat conductive material so that rotation of the input induces rotation of the output due to eddy current principles.

2. The apparatus of claim 1 further comprising, in combination: circumferentially spaced air moving fins integrally extending from the body portion opposite to the first drive component.

3. The apparatus of claim 2 further comprising, in combination: an annular support integrally formed with the body portion for securing the body portion to the other of the input and the output.

4. The apparatus of claim 3 wherein the annular support includes an annular disc portion abuttable with the other of the input and the output and circumferentially spaced air moving vanes integrally extending between the annular disc portion and the body portion.

5. The apparatus of claim 4 wherein the air moving fins and vanes are integrally formed and are at the same circumferential spacing.

6. The apparatus of claim 4 further comprising, in combination: circumferentially spaced air moving fins integrally and axially extending from the body portion opposite to the first drive component, with the front and opposite faces being radially orientated, with the positioning tabs extending from the opposite face of the ring extending generally perpendicular to a radial direction.

7. The apparatus of claim 1 wherein the ring includes a front face adjacent to the first drive component and an opposite face; and wherein the apparatus further comprises, in combination: positioning tabs extending from the front and opposite faces of the ring.

8. The apparatus of claim 7 wherein the positioning tabs are integrally formed with the ring and are formed by bending the ring.

9. The apparatus of claim 8 wherein the ring includes first and second edges extending between the front face and the opposite face, with the first edge being spaced from the second edge; and wherein the positioning tabs are formed as cut-outs in the ring spaced from and between the first and second edges.

10. The apparatus of claim 9 wherein the cut-outs have a physically larger size than the positioning tabs to allow the generally nonmagnetic, heat conductive material to flow through the cut-outs during formation of the second drive component.

11. The apparatus of claim 9 further comprising, in combination: locating ears extending from the first edge of the ring for locating the ring in the body portion while it is being embedded.

12. Method for fabricating a magnetic coupling drive component for an eddy current drive comprising the steps of: providing a ring formed of magnetic flux conductive material; providing a mold defining a volume between a first mold half and a second mold half; positioning the ring in the volume; and introducing molten, generally nonmagnetic, heat conductive material into the volume after the positioning of the ring to embed the ring in a body portion having the shape of the volume so that the body portion and embedded ring provide magnetic coupling in the eddy current drive.

13. The method of claim 12 wherein the ring providing step comprises the step of providing the ring having a front face and an opposite face and including positioning tabs extending from the front and opposite faces of the ring, with the positioning tabs extending from the front face abutting with the first mold half and the positioning tabs extending from the opposite face abutting with the second mold half for preventing the ring from floating in the volume during introducing of the molten material.

14. The method of claim 13 wherein the ring providing step comprises the step of providing the ring having the positioning tabs formed as cut-outs in the ring to facilitate flow of the molten material from between the opposite face and the second mold half to between the front face and the first mold half.

15. The method of claim 14 wherein the ring providing step comprises the step of providing the ring having locating ears; and wherein the mold providing step comprises the step of providing the first mold half having indentations for receiving the locating ears for locating and retaining the ring inside the volume.

16. The method of claim 13 wherein the mold providing step comprises the step of providing the mold including voids extending from and in fluid communication with the volume generally perpendicular to the opposite face of the ring positioned in the volume for forming circumferentially spaced air moving fins; and wherein the ring providing step comprises the step of providing the ring having the positioning tabs extending from the opposite face extending over the voids of the volume.

17. The method of claim 16 wherein the mold providing step comprises the step of providing the mold including an annular space in fluid communication with the voids and spaced from the volume; and wherein the introducing step comprises introducing the molten material into the annular space.

18. The method of claim 12 wherein the introducing step comprises the step of introducing molten aluminum.

19. The method of claim 18 wherein the ring providing step comprises the step of providing the ring formed of steel.

* * * * *

UNITED STATES PATENT AND TRADEMARK OFFICE
CERTIFICATE OF CORRECTION

PATENT NO : 5,994,810

DATED : November 30, 1999

INVENTOR(S) : John B. Davis, et al.

It is certified that error appears in the above-identified patent and that said Letters Patent is hereby corrected as shown below:

Col. 4, line 63, cancel "paced" and substitute therefor -- spaced --.

Col. 4, line 64, cancel "paced" and substitute therefor -- spaced --.

Col. 8, line 8, cancel "resent" and substitute therefor -- present --.

Signed and Sealed this

Fourth Day of July, 2000

Attest:

Q. TODD DICKINSON

Attesting Officer

Director of Patents and Trademarks